(12) United States Patent
Xu et al.

(10) Patent No.: US 11,287,376 B2
(45) Date of Patent: Mar. 29, 2022

(54) SYSTEM AND METHOD TO STANDARDIZE WHITENESS CALIBRATION AND MEASUREMENT

(71) Applicant: DATACOLOR INC., Lawrenceville, NJ (US)

(72) Inventors: Zhiling Xu, Princeton Junction, NJ (US); Michael H. Brill, Kingston, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 433 days.

(21) Appl. No.: 16/513,236

(22) Filed: Jul. 16, 2019

(65) Prior Publication Data

US 2021/0018435 A1    Jan. 21, 2021

(51) Int. Cl.
| | | |
|---|---|---|
| *G01N 21/47* | (2006.01) | |
| *G01N 21/27* | (2006.01) | |
| *G01N 21/64* | (2006.01) | |

(52) U.S. Cl.
CPC ....... *G01N 21/4738* (2013.01); *G01N 21/276* (2013.01); *G01N 21/645* (2013.01); *G01N 2021/4766* (2013.01); *G01N 2021/6484* (2013.01)

(58) Field of Classification Search
CPC ............. G01N 21/4738; G01N 21/276; G01N 21/645; G01N 2021/4766; G01N 2021/6484; G01N 21/55; G01N 2021/555; G01N 2021/6493; G01N 21/274; G01N 21/33
USPC ...................................................... 250/559.1
See application file for complete search history.

(56) References Cited

U.S. PATENT DOCUMENTS

| | | |
|---|---|---|
| 9,291,564 B2 | 3/2016 | Xu et al. |
| 2008/0137086 A1* | 6/2008 | Imura .................. G01N 21/251 356/433 |

OTHER PUBLICATIONS

Spectrophotometer CM-36dG, cm-36dGV and CM-36d, Konica Minolta Inc., (2021), 8 pages.

* cited by examiner

*Primary Examiner* — David P Porta
*Assistant Examiner* — Gisselle M Gutierrez
(74) *Attorney, Agent, or Firm* — Leason Ellis LLP

(57) ABSTRACT

By way of overview and introduction, various embodiments of the apparatus, systems and methods described herein are directed improved approaches to aligning and standardizing different total spectral radiance factor shapes measured with different instruments. Furthermore, in one or more configurations and approaches, the disclosure presented herein is directed to obtaining a whiteness calibration value for use in sample measurements without the need of UV filter adjustments.

19 Claims, 7 Drawing Sheets

SYSTEM AND METHOD TO STANDARDIZE WHITENESS CALIBRATION AND MEASUREMENT

FIELD OF INVENTION

The present application is directed to systems and methods for providing device independent measurements of the total spectral radiance factor of a reflective sample.

BACKGROUND

Optical brightening agents ("OBAs") are fluorescent additives used to enhance the appearance of the color of fabric and paper. In particular, OBAs cause a "whitening" effect that makes materials look less yellow by increasing the overall amount of blue light reflected. Sometimes, this "whiteness" quality can be represented in color measurements as a single number. For the study of OBA-enhanced paper or fabric samples, however, a single value is not always sufficient to evaluate the whiteness property. Instead, a total spectral radiance factor ("TSRF") is used to express more detailed information about a sample that has been OBA-enhanced.

TSRF is often defined as the ratio of spectral radiance illuminated and observed, under the same conditions at wavelength $\lambda$, of an observed fluorescent sample and of a completely diffuse, non-fluorescent, perfectly reflecting surface. Alternatively, TSRF may be defined as the ratio of the flux intensity at wavelength $\lambda$ returned from the fluorescent sample and from the completely diffuse reflecting surface in the same solid angle of the same direction, when illuminated under the same conditions.

Thus, TSRF may be expressed as: $B(\lambda)=S(\lambda)/S_0(\lambda)$ where $S(\lambda)$ is the intensity at wavelength $\lambda$ of the radiant light returned by the fluorescent sample, and $S_0(\lambda)$ is the intensity at wavelength $\lambda$ of the radiant light reflected by the completely diffuse reflecting surface. In general, $B(\lambda)$ includes two parts, as expressed below: $B(\lambda)=R(\lambda)+\Phi(\lambda)$ where $R(\lambda)$ is the reflection spectral radiance factor (i.e., reflectance) and $\Phi(\lambda)$ is the fluorescent spectral radiance factor.

As discussed in detail in the commonly-owned U.S. Pat. No. 9,291,564 and titled "Method and apparatus for aligning measured spectral radiance factors among different instruments", herein incorporated by reference as if presented in its entirety, although $R(\lambda)$ is purely sample related, the value for $\Phi(\lambda)$ is the ratio of fluorescent light and diffuse reflection of the illuminant light and thus depends on the light source as well as the sample. For different instruments, the spectral power distribution of the light source can be dramatically different and thus the directly measured TSRF of the same sample by different instruments can vary dramatically. Although different methods have been proposed to align the measurement results of one instrument to another, including the use of adjustable UV filter(s), it remains a challenge to compare the result from different instruments.

Thus, what is needed in the art is an approach that overcomes the difficulties encountered when attempting to obtain total spectral radiance factor that can be used in a device independent manner. More specifically, what is needed is an approach that allows the TSRF values of samples obtained under different measurement instruments to be compared to one another.

SUMMARY

In one non-limiting implementation, a system and method for providing a device independent total spectral radiance factor measurement of a sample is provided. In one arrangement the method includes obtaining, using a light measurement instrument, a first measurement of the sample under at least one illuminant that excludes UV spectral radiance and obtaining, using a light measurement instrument, a second measurement of the sample under the at least one illuminant that includes a UV excited spectral radiance. The method further includes obtaining a compensation value for the UV excited spectral radiance measurement and accessing a standard illumination profile from a pre-defined list of standard illuminant profiles. In a particular implementation of the method described, a total spectral radiance factor value for the sample is obtained by obtaining the sum of the first measurement and the quotient of the product of the compensation value and the second measurement value divided by the accessed standard illumination profile; and outputting the total spectral radiance factor value.

A method and a system have also been developed to align and standardize the total spectral radiance factor (TSRF) obtained from different instruments by measuring UV excluded reflection spectral radiance factor (RSRF) and UV excited fluorescent spectral radiance factor (FSRF) separately, and after that, whiteness can be easily calibrated without requiring any moving part of the instrument.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the apparatus, systems and methods described herein are directed to aligning and standardizing different total spectral radiance factor shapes measured with different instruments. Furthermore, in one or more configurations and approaches, the disclosure presented herein is directed to obtaining a whiteness calibration value for use in sample measurements without the need of UV filter adjustments.

Those possessing an ordinary level of skill in the relevant art will appreciate that with the application of optical brightening agents (OBAs) to products or materials, the "whiteness" of the product becomes an important indicator of the degree of the "whitening" effect caused by OBAs in fabric, paper or other materials. In many cases, a single number describing the whiteness of the material in question is not sufficient for the study of OBA-enhanced paper or fabric samples, and thus a total spectral radiance factor (TSRF) can be used to express a more detailed understanding of the characteristics of a sample that includes OBAs.

As used herein "TSRF" is defined as the ratio of spectral radiance illuminated and the spectral radiance observed, under the same conditions, at a given wavelength ($\lambda$), of an observed fluorescent sample and of a completely diffuse, non-fluorescent, perfectly reflecting surface. Recast more precisely, TSRF can be represented as the ratio of the flux intensity at wavelength $\lambda$ returned from the fluorescent sample and from the completely diffuse perfectly reflecting surface in the same solid angle of the same direction, when illuminated under the same conditions.

Figure 6:
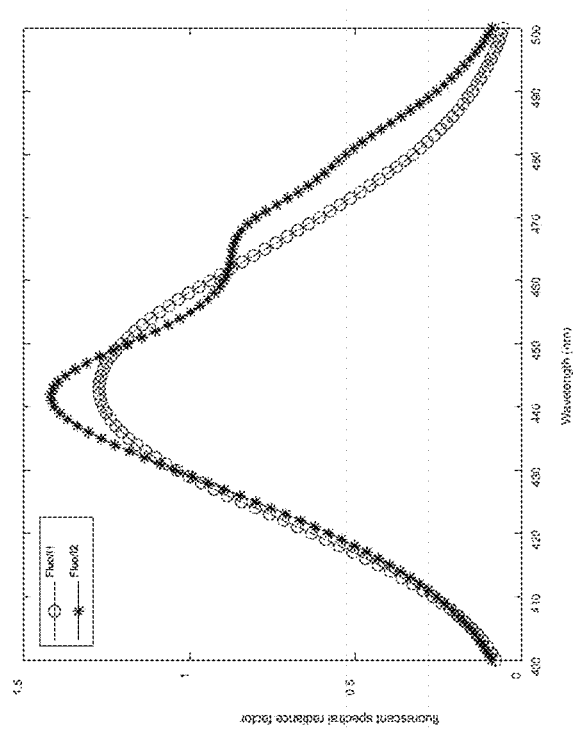
FIG. 6 is a chart detailing a measurement process in accordance with known approaches.
Figure 7:
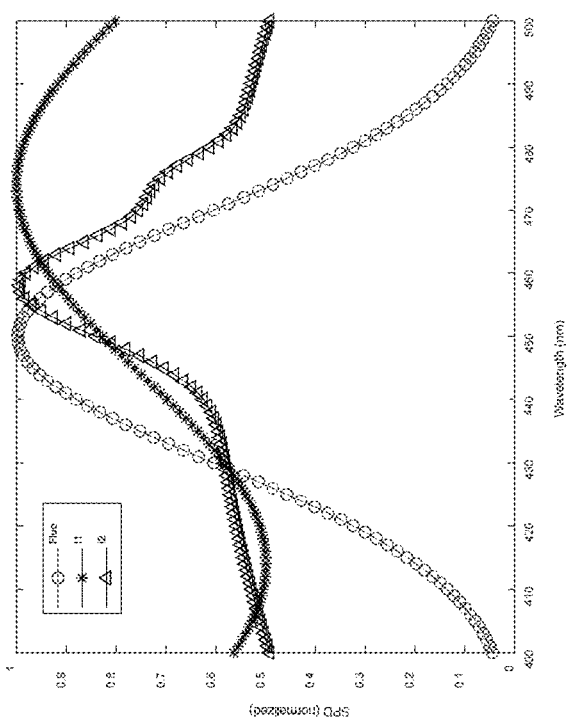
FIG. 7 is a chart detailing a measurement process in accordance with known approaches.

TSRF can be calculated as $B(\lambda)=R(\lambda)+\Phi(\lambda)$ where $R(\lambda)$ is the reflection spectral radiance factor (i.e., RSRF) and $\Phi(\lambda)$ is the fluorescent spectral radiance factor (FSRF), which is the ratio of fluorescent light and diffuse reflection of the illuminant light. Thus, the whiteness calculation depends on information about the light source as well as the sample. For different instruments, the spectral power distribution of the light source can be dramatically different and thus the directly measured TSRF of the same sample by different instruments can vary dramatically. As shown in FIG. 6-7, even if the fluorescent signal from the same sample remains the same when measured with different instruments, the illumination profile of the two instruments can be different, and thus the FSRF values are different. As a result, measurements made of the same sample using different instruments cannot be compared to one another.

It should be appreciated that the foregoing descriptions, for ease of explanation, describe a use case for determining the whiteness measurement for fluorescent materials. More broadly, the described approaches can evaluate materials or samples where the excitation spectrum is in the ultraviolet wavelength region and does not overlap the visible range. For circumstances where the excitation spectrum is not in the ultraviolet range, the foregoing approaches can be applied to make white assessments for such samples, so long as the excitation and emission wavelength ranges for the sample do not overlap.

Figure 1:
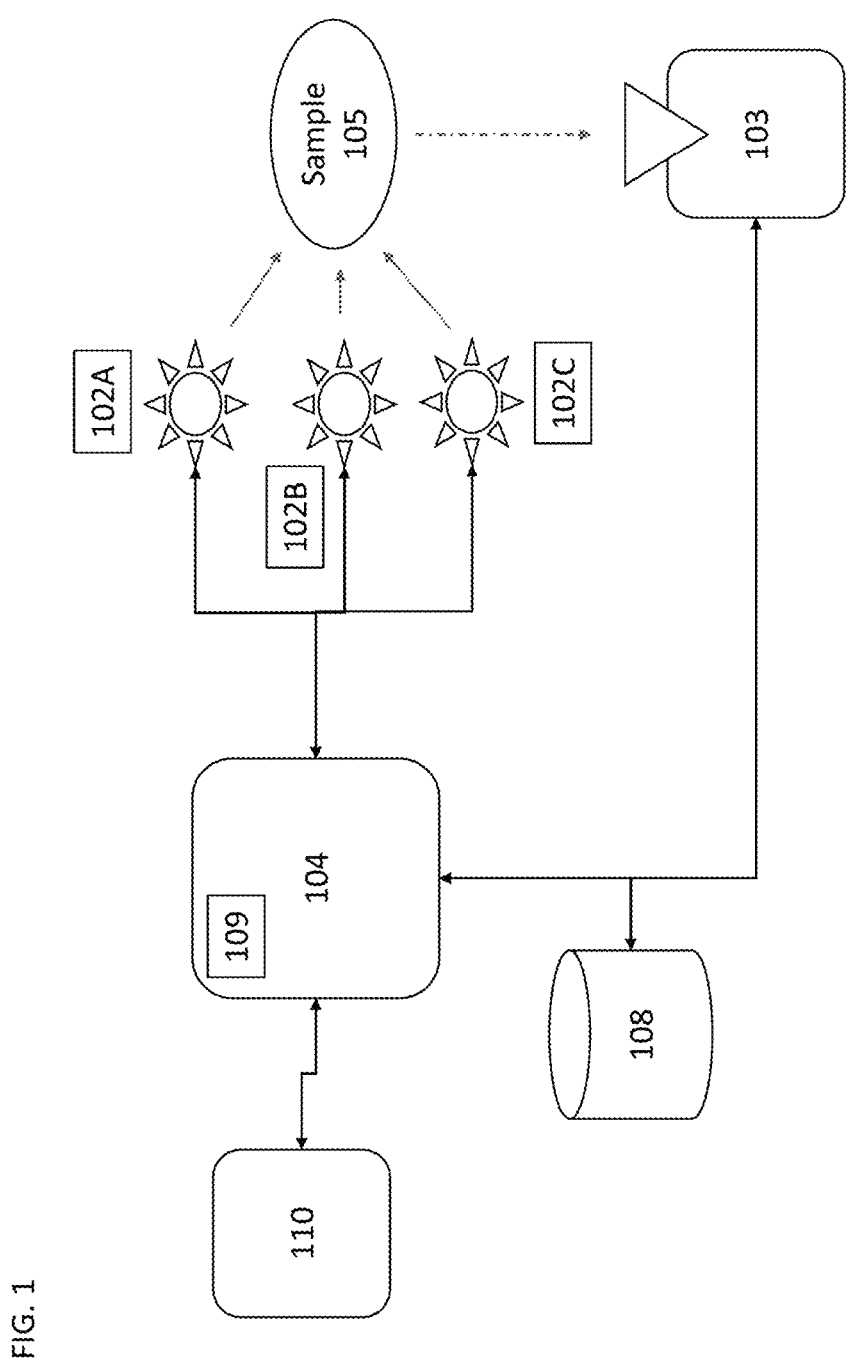
FIG. 1 illustrates devices and components that interface over one or more data communication networks in accordance with one or more implementations of the present application.

Referring now to the drawings, in which like references numerals refer to like elements, FIG. 1 illustrates devices and components for obtaining color measurement data that interface over one or more data communication networks in accordance with one or more implementations of the present application. As shown, FIG. 1 illustrates a sample 105 under analysis by color measurement device or sensor 103. Here, the color sample 105 can be any type or form of physical article having color or spectral properties in need of analysis, such as a product that has been enhanced with OBAs. For instance, the color sample 105 is a fabric sample, such as fleece or fabric blends, a paper sample, or other material where the whiteness value of the product is desired or needed. In yet a further implementation, the color sample 105 is an object or item integral to a larger structure or item, such as a dashboard of an automobile, or a section of wall of a structure. For example, the color sample 105 is a section or portion of stucco, carpe, building materials, housing, chassis, packaging, or another item.

With continued reference to FIG. 1, the color sample 105 is placed such that the color sample 105 can be illuminated by at least one (1) illuminant 102.

In a further implementation, and for ease of explanation with the examples provided herein, the color sample 105 includes three (3) or more different illuminants. In one or more implementations, the illuminants 102A, 102B and 102C are commercially available lighting sources. For instance, the illuminants 102A-C, are separate devices that are configurable to produce a light with certain spectral power distributions. For instance, the light sources 102A-C are one or more discrete light emitting elements, such as LEDs, OLEDs, fluorescent, halogen, xenon, neon, D65 light, fluorescent lamp, mercury lamp, Metal Halide lamp, HPS lamp, incandescent lamp or other commonly known or understood lighting sources. In one arrangement, at least one of the light sources is a broad-band LED.

In one or more implementations, the illuminants 102A-C include a lens, filter, screen, enclosure, or other elements (not shown) that are utilized in combination with the light source of the illuminants 102A-C to direct a beam of illumination, at a given wavelength, to the sample 105.

In one implementation, the illuminants 102A-C are operable or configurable by an internal processor or other control circuit. Alternatively, the illuminants 102A-C are operable or configurable by a remote processor or control device having one or more linkages or connections to the illuminants 102A-C. As shown in FIG. 1, the illuminants 106A-C are directly connected to a color measurement device 103.

As further shown in FIG. 1, the illuminants 102A-C are positioned relative to the sample 105 and color measurement device 103 so as to provide a 45/0, d/8, or other illumination/pickup geometry combination.

Continuing with FIG. 1, light incident upon the sample 105 (shown in solid lines) is transferred (as shown in dashed lines) and then captured or measured by a color measurement device 103. Here, the color measurement device 103 can be a color sensor or image capture device. For example, the color measurement device 103 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof. In a particular implementation, the color measurement device 103 is spectrophotometer manufactured by Datacolor Inc. of Lawrenceville, N.J.

In a particular implementation, the color measurement device 103 is configured to generate an output signal upon light being incident upon the color measurement device 103 or a light sensing portion thereof. By way of non-limiting example, the color measurement device 103 is configured to output a signal in response to light being incident upon a light sensor or other sensor element integral or associated with the color measurement device 103. For instance, the color measurement device 103 is configured to generate a digital or analog signal that corresponds to the wavelength or wavelengths of light that are incident upon a light sensor integral to the color measurement device 103. In one or more configurations, the color measurement device 103 is configured to output spectral information, RGB information, or another form of multi-wavelength data representative of light reflected off the sample 105.

The color measurement device 103, in accordance with one embodiment, is a stand-alone device capable of storing local data corresponding to measurements made of the sample 105 within an integrated or removable memory. In an alternative implementation, the color measurement device 103 is configured to transmit one or more measurements to a remote storage device 108 or processing platform, such as processor 104. In configurations calling for remote storage of measurement data, the color measurement device 103 is equipped or configured with network interfaces or protocols usable to communicate over a network, such as the internet.

Alternatively, the color measurement device 103 is connected to one or more computers or processors, such as processor 104, using standard interfaces such as USB, FIREWIRE, Wi-Fi, Bluetooth, and other wired or wireless communication technologies suitable for the transmission measurement data.

The output signal generated by the color measurement device 103 is transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, such as but not limited to, functions, algorithms, classes and the like. In one arrangement, the software modules are stored as software in the memory 109 of the processor 104. Modules, in one arrangement, can also include hardware elements that are substantially configured or made operable to carry out any steps, processes or procedures as described herein. In one implementation, the processor 104 is located within the same device, housing or enclosure as the color measurement device 103. However, in another implementation, the processor 104 is remote or separate from the color measurement device 103.

In one configuration, the processor 104 is configured through one or more software modules to generate, calculate, process, output or otherwise manipulate the output signal generated by the color measurement device 103.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 103 either directly, or through a communication linkage.

The processor 104 is configured to execute a commercially available or custom operating system, e.g., MICROSOFT WINDOWS, APPLE OSX, UNIX or Linux based operating system in order to carry out instructions or code.

In one or more implementations, the processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices 109 (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

The processor 104 is configured to store data either locally in one or more memory devices. Alternatively, the processor 104 is configured to store data, such as measurement data or processing results, in a local or remotely accessible database 108. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the processor 104 to retrieve and store data within the database 108.

In one implementation, each element provided in FIG. 1 is configured to communicate with one another through one or more direct connections, such as through a common bus. Alternatively, each element is configured to communicate with others through network connections or interfaces, such as a local area network LAN or data cable connection. In an alternative implementation, the color measurement device 103, illuminants 102A-C, processor 104, and database 108 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 108 and or color measurement device 103.

In one arrangement, the processor 104 communicates with a display device 110 for displaying data. In one arrangement the display device 110 and processor 104 are incorporated into a single form factor, as in the case of a notebook computer, portable device and the like. In another configuration, the display device is a computer or processor remote from the processor 104 that enables the user to receive data. The display device 110 further includes one or more associated input devices and/or hardware (not shown)

that allow a user to access information, and to send commands and/or instructions to the processor 104 and the color measurement device 103. In one or more implementations, the display device 110 is a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

It will be appreciated that the described arrangement of elements can, in one implementation, be used to measure and determine the whiteness or whitening effect of various optical brightening agents (OBAs) on a product or sample under analysis. As described in the foregoing, the use of a single value to determine the whiteness of a sample containing OBAs fails to accurately capture the specifications of the product. Instead, the presently described approach uses the total spectral radiance factor (TSRF) to express more detailed information about a sample than a simple single value.

As noted, TSRF can be described as the ratio of the flux intensity at wavelength λ returned from the fluorescent sample and from the completely diffuse perfectly reflecting surface in the same solid angle of the same direction, when illuminated under the same conditions. Thus, TSRF may be expressed as:

$$B(\lambda) = \frac{S(\lambda)}{S_0(\lambda)} \quad (1)$$

where $S(\lambda)$ is the intensity at wavelength λ of the radiant light from the fluorescent sample, and $S_0(\lambda)$ is the intensity at wavelength λ of the radiant light reflected from the completely diffuse reflection surface.

In general, $B(\lambda)$ includes two parts as indicated by equation (2):

$$B(\lambda) = R(\lambda) + \Phi(\lambda) \quad (2)$$

where $R(\lambda)$ is the reflection spectral radiance factor (RSRF) and $\Phi(\lambda)$ is the fluorescent spectral radiance factor (FSRF). In operation, the value for $R(\lambda)$ can be obtained solely from the sample 105. That is, the value for $R(\lambda)$ varies depending on the sample measured, and not the spectral power distribution of the light source. In contrast, the value for $\Phi(\lambda)$ is obtained as the ratio of fluorescent light and diffuse reflection of the illuminant light. Thus, the value for $\Phi(\lambda)$ depends both on information about the sample (as in $R(\lambda)$) as well as the measurement configuration. More specifically, in order to determine $\Phi(\lambda)$, information about the light source used to capture the measurement is also needed.

It is well understood that the spectral power distribution of the light source for different instruments can be dramatically different. As a result, any determination of $\Phi(\lambda)$ will necessarily be linked to the device used to measure FSRF. Thus, a measurement of $\Phi(\lambda)$ using a first measurement device will vary from the measurement of $\Phi(\lambda)$ for a second measurement device, even when the sample being measured by both measurement devices are the same.

Thus, the arrangement provided for in FIG. 1 can be used to align and standardize the different TSRF measured with different instruments, thus providing for a device independent approach to obtaining the TSRF for a given object. This approach represents an improvement in the field of color measurement as it allows for measurements made using different devices to be compared to one another. Such comparisons allow for better understanding and quality control of the properties of the sample under analysis.

Figure 2:
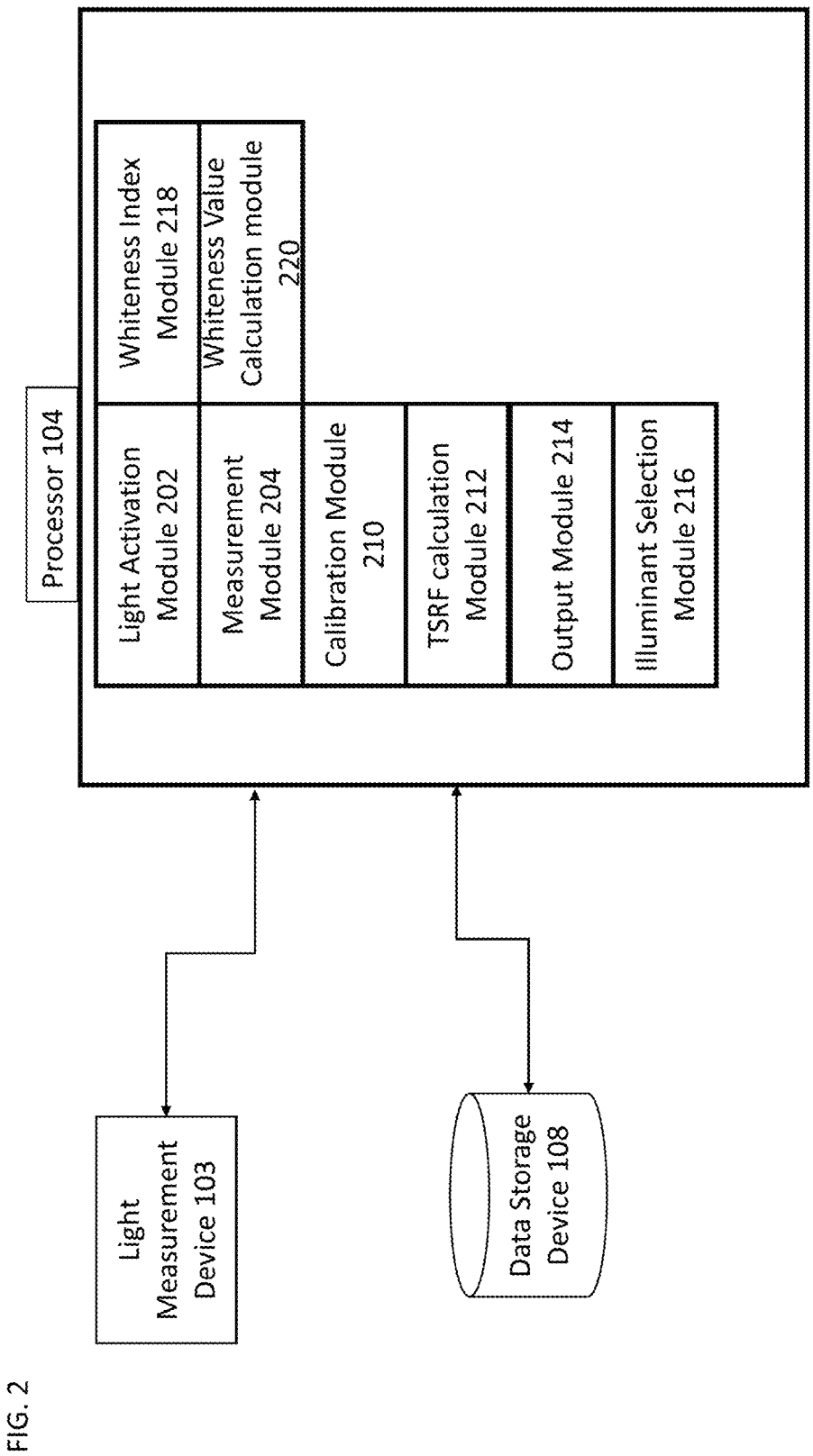
FIG. 2 provides a block diagram of various modules that configure one or more processors in accordance with one or more implementations of the present application.
Figure 3:
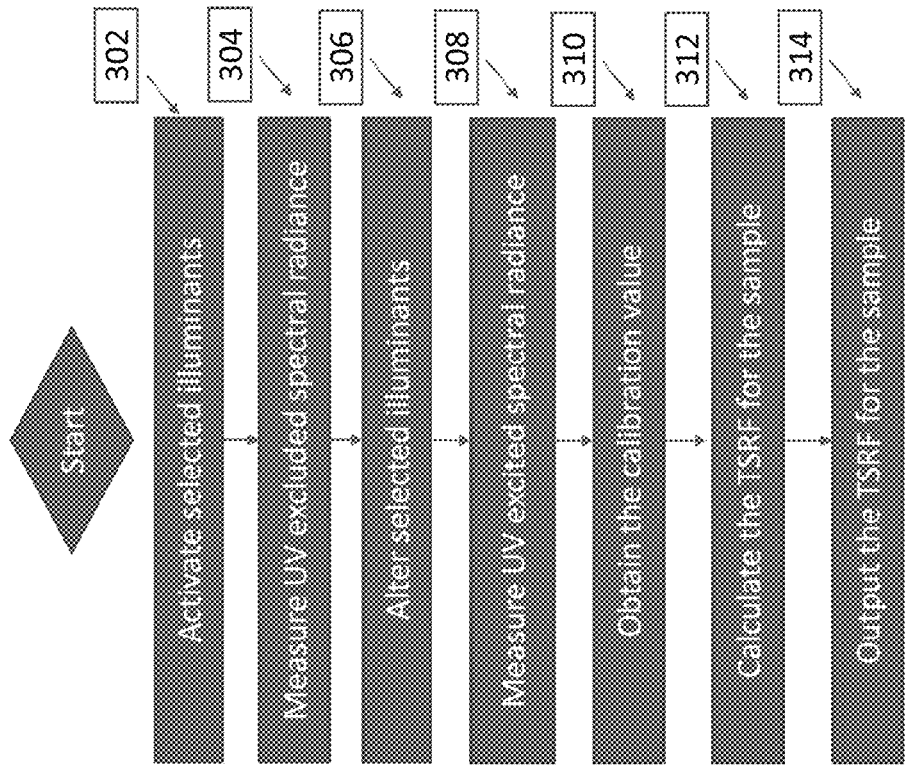
FIG. 3 provides a flow diagram detailing particular steps in the device independent whiteness measurement process according to one or more implementations of the present application.

An overview of the device independent measurement approach is described in FIGS. 2 and 3. In one implementation, a group of various wavelength LEDs are used as the illumination sources 102A-C. By way of non-limiting example, the LEDs used as the illumination source 102A-C are a collection of illuminants capable of providing light in the 365 nm, 420 nm, and 425 nm to 700 nm wavelength ranges. For instance, three (3) light sources are used, where at least one light source is a LED configured to output light at 365 nm, at least one illuminant is a LED configured to output light at 420 nm wavelength, and at least one illuminant is a LED configured to provide an illumination in a broadband white (i.e. 425-700 nm) wavelength.

Turning now to the flow diagram of FIG. 3, the measurement configuration described in FIG. 1 is used to obtain measurements of a sample 105. For instance, the processor 104 receives a signal to begin initiation of a measurement process. In one arrangement, this initiation signal is a start flag, signal, code or input that is received by the processor 104.

In response to the initiation or start signal, the processor 104 is configured to activate one or more of the illumination sources 102A-C and measure the light incident off of the sample 105. For instance, the processor 104 is configured by a light activation module 202 to control of the activation state of the one or more illumination sources 102A-C. In a particular arrangement, the light activation module 202 is one or more hardware and/or software modules that configures the processor 104 to selectively activate or control the one or more lights or illumination sources 102A-C. The light activation module 202, in one implementation, is code that configures the processor 104 though one or more software modules, algorithms, or routines to generate an activation signal, flag or message that is then sent to the one or more illumination sources 102A-C.

By way of specific example, as shown with respect to step 302, the processor 104 is configured by the light activation module 202 to activate the illumination sources 102A-C according to a pre-determined protocol or routine. For instance, to initiate a routine or protocol where the user desires to measure the whiteness of a sample 105, the light activation module 202 configures the processor 104 to initiate a control signal that is sent to the illumination sources 102A-C. In one arrangement, the light activation module 202 configures one or more illumination sources 102A-C to generate illumination in the visible wavelength range. For instance, all of the illumination sources 102A-C are configured to operate and output light in their respective wavelength ranges.

In another configuration, the light activation module 202 configures the processor 104 to deactivate any currently activated illumination sources 102A-C. For example, the light activation module 202 is configured to determine the illumination or activation status of one of more illumination sources 102A-C and cause one or more illumination sources 102A-C to be deactivated. In a further implementation, the light activation module 202 configures the processor 104 to determine the wavelength range or light output of one or more illumination sources 102A-C. Here, the light activation module 202 configures the processor 104 to evaluate one or more flags or signals indicating the make, model, or capability of the illumination sources 102A-C. For instance, where one or more illumination sources 102A-C includes a filter, such an evaluation can determine if the filter has been engaged. Where the filter is electronically controlled, the light activation module 202 configures the processor 104 to selectively engage such filter(s).

As shown in step 304, the activated illumination sources 102A-C are used to cause light to be incident off of the sample 105. The light measurement device 103 is configured and arranged to receive light that has been relayed off of the sample 105. Thus, the light measurement device 103 is able to measure the reflectance of the sample 105 using the activated LEDs. Where the selected illumination sources 102A-C are configured to emit only visible light, the light measurement device will measure UV excluded illumination light source(s).

The light measurement device 103 is configured to generate an output signal in response to the light incident upon a light sensor thereof. In implementations where the light that is incident upon the sensor of the light measurement device excludes UV excitation light, the light measurement device outputs a signal that corresponds to the value of the measured reflectance, referred to as $R(\lambda)$ in equation (2).

Continuing with step 304, the processor 104 is configured by the measurement module 204 to record or store the measurement output of the light measurement device 103. For example, the measurement module 204 is software and/or hardware that configures the processor 104 to receive input values from the light measurement device 103. The received input values are stored in one or more temporary or long-term data storage repositories. The measurement module 204 configures the processor 104 to store the received signal or data values received from the light measurement device 103. In a further implementation, the measurement module 204 converts the signals received from the light measurement device 103 into one or more different formats for further use by the processor 104. For example, in one arrangement, the measurement values received by the processor 104 from the light measurement device 103 are converted into a data object, digital value, variable reference, pointer or other data construct that can be evaluated, transmitted, stored, or modified by the processor 104.

Continuing with the flow diagram of FIG. 3, once the UV excluded measurements have been made of the sample 105, the illumination module 202 configures the processor 104 to deactivate the visible light wavelength illuminants. For example, as shown in step 306, the processor 104 is configured to generate a signal or flag that causes the illumination sources 102A-C that generate visible light to deactivate. In an arrangement where all of the illumination sources 102A-C are activated, the processor 104 is configured by one or more modules or submodules of the illumination module 202 to deactivate only those illumination sources 102A-C that generate non-UV light. Alternatively, where the LEDs that output UV light are not activated, the illumination module 202 causes the processor 104 to activate one or more illuminants that are configured to output UV light. In one arrangement, the illuminant activated is a 365 nm LED.

In step 308, UV light incident upon the sample 105 is received by a sensor of the light measurement device 103. The light measurement device 103, in turn, is configured to generate a signal or value that corresponds to the fluorescence $f(\lambda)$ of the sample. The generated value or signal is received by the processor 104 and stored. For example, the processor 104 is configured by the measurement module 204 to store the signal generated by the light measurement device 103 in response to receiving UV light that has been incident upon the sample 105.

In one arrangement the raw, or unprocessed, measurement of the light measurement device 103 can be used to directly used to represent $R(\lambda)$ and/or $f(\lambda)$. In another arrangement, the measurement obtained from the light measurement device 103 are calibrated or compensated prior to further calculation. In order to compensate the fluctuation of the excitation light, the light measurement device 103 can include a reference channel. The reference channel of the light measurement device 103 can be used to measure UV excluded light measurement (as is usually done in traditional $R(\lambda)$ measurement) as well as measuring the fluorescence measurements $f(\lambda)$.

As previously noted, the sample and illuminant dependent components of FSRF can be represented as $\Phi(\lambda)$ and can be further described as:

$$\Phi(\lambda) = \frac{kf(\lambda)}{I(\lambda)} \qquad (3)$$

where $f(\lambda)$ is the fluorescence profile determined only by the sample 105 in step 308 and $I(\lambda)$ is an illumination profile. Here, the illumination profile is not related to the sample 105 but is specific to the instrument itself. Since the magnitude of FSRF is also determined by the UV content of the illumination light source, a constant k in EQU. 3 reflects the impact of the light source used.

In one arrangement, the measurement configuration described herein is configured to use the measurement values obtained in step 304, $R(\lambda)$, and 308, $f(\lambda)$, to obtain the total spectral radiance factor value $B(\lambda)$, for the sample 105 according to:

$$B(\lambda) = R(\lambda) + \frac{kf(\lambda)}{I(\lambda)} \qquad (4)$$

Here, the values for k and $I(\lambda)$ were previously derived or determined, as described in further detail herein. Alternatively, the processor 104 is configured to access these values from a data storage location or electronic memory. By way of example, as shown in step 310, the calibration module 310 configures the processor 104 to access the stored values for k and $I(\lambda)$ from database 108.

Continuing with this example, as shown in step 312, the accessed calibration value k and the illumination profile are used to calculate the total spectral radiance factor value of a given sample according to EQU. 4. For instance, the processor 104 is configured by a calculation module 312 to calculate the TSRF value for a given sample using one or more algorithms, routines or processes. In one configuration, the calculation module 312 is hardware and/or software that configures the processor 104 to receive the values for $R(\lambda)$, $f(\lambda)$, k and $I(\lambda)$ from either local, remote, short term or long-term data storage and calculate the value for TSRF for the sample according to EQU 4. Upon calculation of the TSRF value according to step 312, the processor 104 is configured to output the TSRF for use or storage.

As shown in step 314, the processor 104 is configured by an output module 214 to output the calculated TSRF value to an output device 110. In one instance, the output module 214 is hardware and/or software that enables the processor 104 to output the calculated TSRF value to one of the display device 110, data storage device 108 or another device or software module that is in communication with the processor 104.

In one or more arrangements, the described measurement configuration can also be used to obtain or derive a whiteness index for the sample 105. By way of background, in traditional spectrophotometers the fluorescence signal of a sample cannot be directly measured. Therefore, the measured FSRF and TSRF values are tied to the illumination profile of the instrument used to obtain those values. As such, direct comparisons between these two values cannot be accomplished. However, as described in more detail herein, where the fluorescence signal f(λ) is directly measured, as accomplished in step 308, then the illumination profile I(λ) in EQU (3) or (4) can be substituted with a standard illumination profile $I_{standard}(\lambda)$. In one arrangement the substituted illumination profile can be obtained from a database 108 or other data storage device. For example, the processor 104 is configured by an illuminant selection module 216 to access from a data storage device a standard illumination profile value, such as a standard reference value for D50, D65 or C or other illuminant profiles. In a particular sub-step of step 312, the processor 104 is configured by the illuminant selection module 216 to access from database 108 a standard illumination profile $I_{standard}(\lambda)$ corresponding to a D65 illuminant. In a particular configuration, the processor 104 is configured by the illumination selection module 216 to adopt as the value for $I_{standard}(\lambda)$ the spectral power distribution of a xenon lamp. In one arrangement, the processor 104 receives an input signal that causes the processor 104 to select the illuminant profile for a xenon lamp.

The processor 104, in an alternative arrangement, receives user input that causes the processor 104 to query a look-up table or other index of available illuminant profiles and select the desired profile. In another configuration, based on one or more factors, conditions or circumstances, the processor 104 is configured to automatically select a given illuminant profile. For example, based on one or more user inputs, such as the type of material or sample under analysis, the processor is configured to select a pre-determined illuminant profile.

By way of further detail, the illuminant selection module 216 configures the processor 104 to generate, by way of the TSRF calculation module 212, measurement results using LED based measurements that are aligned with a measurement using a different illuminant. More specifically, the measurement of a sample made using the LEDs described herein can be aligned to match the expected output of a measurement device utilizing a different illuminant type. For instance, where the measurement configuration described herein is configured as a spectrophotometer that utilizes one or more LEDs to illuminate a sample, some of the outputs of such a configuration can be made to match the corresponding outputs of a similar or identical spectrophotometer that uses a xenon lamp through the selection of the relevant illuminant standard. For example, by setting $I_{standard}(\lambda)$ to a specific xenon flash spectrum, a whiteness index value for the sample can be calculated using the ASTM E313 protocol (Standard Practice for Calculating Yellowness and Whiteness Indices from Instrumentally Measured Color Coordinates).

In order to obtain a true computation of a whiteness index, the processor 104 is configured by one or more modules or submodules of the whiteness index module 218 to obtain the whiteness index of a sample using the TSRF value calculated in step 314 according to the ASTM E313 protocol. However, it will be further appreciated that the intrusion of light spectra, from f(λ) and the ASTM E313 values can, if uncorrected, add an additional layer of complexity to obtaining the whiteness index.

Figure 4:
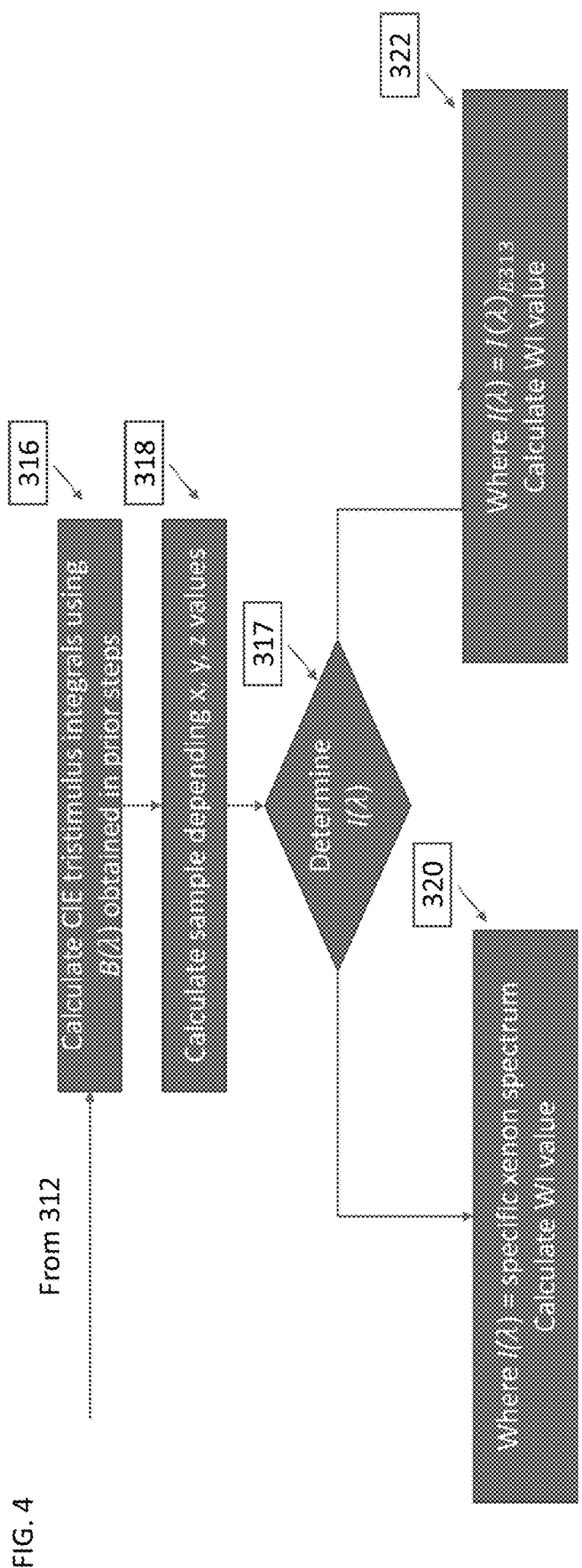
FIG. 4 flow diagram detailing particular steps in the device independent whiteness measurement process according to one or more implementations of the present application.

As shown in Step 316 in FIG. 4, the processor 104 is configured by a tristimulus calculation submodule of the whiteness index module 218. The tristimulus calculation sub-module configures the processor 104 to derive the CIE tristimulus values by integrating over wavelength of an ASTM E313-selected illuminant where:

$$X = 100 \frac{\int d\lambda B(\lambda)I(\lambda)_{E313}\bar{x}(\lambda)}{\int d\lambda I(\lambda)_{E313}\bar{y}(\lambda)}$$

$$Y = 100 \frac{\int d\lambda B(\lambda)I(\lambda)_{E313}\bar{y}(\lambda)}{\int d\lambda I(\lambda)_{E313}\bar{y}(\lambda)}$$

$$Z = 100 \frac{\int d\lambda B(\lambda)I(\lambda)_{E313}\bar{z}(\lambda)}{\int d\lambda I(\lambda)_{E313}\bar{y}(\lambda)}$$

Here, $\bar{x}$, $\bar{y}$ and $\bar{z}$ each are color matching functions selected using the 1931 or 1964 standards, $I(\lambda)_{E313}$ is an illuminant (i.e. D50, D65 or C.), and B(λ) represents the TSRF value.

The processor 104 is configured by a sample dependent calculation sub-module of the whiteness index module 218 to calculate the x, y values needed for the whiteness index calculation. For example, the X, Y and Z values calculated in step 316 can be used to calculate the sample-dependent values x, y and Y according to step 318, as provided below:

$x = X/(X+Y+Z)$ $y = Y/(X+Y+Z)$ $Y = Y$

As shown in steps 320 and 322, using the sample independent values obtained in step 318, the whiteness index for a sample can be calculated by a processor 104 configured by a whiteness index calculation module 218. Here, the processor 104 is configured to evaluate the whiteness index of a sample according to the standard calculation protocol. In one arrangement, the processor 104 is configured by the whiteness index calculation module 218 to calculate the white index according to the ASTM E313 standards, such that a whiteness index value WI is calculated according to:

$WI = Y + (WI,x)(x_n - x) + (WI,y)(y_n - y)$ where (WI, x), (WI, y), $x_n$ and $y_n$ depend on the chosen illuminant and observer. The possibilities for these values are enumerated in Table 1 and correspond to constants that do not depend on the sample.

TABLE 1

| | CIE Standard Illuminant and Observer | | | | | |
|---|---|---|---|---|---|---|
| Value | C, 31 | $D_{50}$, 31 | $D_{65}$, 31 | C, 64 | $D_{50}$, 64 | $D_{65}$, 64 |
| $X_n$ | 0.3101 | 0.3457 | 0.3127 | 0.3104 | 0.3477 | 0.3138 |
| $Y_n$ | 0.3161 | 0.3585 | 0.3290 | 0.3191 | 0.3595 | 0.3310 |
| WI, x | 800 | 800 | 800 | 800 | 800 | 800 |
| WI, y | 1700 | 1700 | 1700 | 1700 | 1700 | 1700 |

In one particular implementation, since the WI index value calculations utilize the CIE tristimulus values calculated in steps 316-318, the sample dependent values for the WI include the product of $B(\lambda)$ and $I(\lambda)_{E313}$. Because B(L) can be rewritten (according to eq. 4) as $$R(\lambda) + \frac{kf(\lambda)}{I_{standard}(\lambda)}$$

then the product of this value and $I(\lambda)_{E313}$ will include a ratio of two illuminants, the ASTM E313 illuminant and $I_{standard}$.

As shown in step 317 of the flow diagram of FIG. 4, the processor 104 can be configured to determine the value for $I_{standard}$ selected in step 312. In an alternative implementation, a different value for $I_{standard}$ is selected, while the measurement for $B(\lambda)$ and $f(\lambda)$ remain the same. In a specific implementation the selection of $I_{standard}$ is configured as a software or code switch that alters the value of $I_{standard}$ depending on user input or another factor.

As shown in step 320, when the processor 104 is configured by one or more sub-modules of the whiteness index calculation module 218 to select a value for $I_{standard}$ that corresponds to a specific xenon lamp spectrum, then the whiteness index calculation module 218 configures the processor 104 to generate a whiteness index for the sample that includes both the selected illuminant value ($I_{standard}$) as well as the value of $I(\lambda)_{E313}$. This approach introduces both light spectra into the calculation of WI, but since these values are independent of the measurement instrument, the WI index value calculated does not depend on the measurement instrument.

An alternative configuration is provided that overcomes the difficulties inherent in calculating a whiteness index that uses a ratio of two different light spectra. By making the fluorescent light from the fluorescent material invariant to any other light (except for intensity via the excitation LED), a whiteness index can then be derived that is more stable. Specifically, the fluorescence profile, $f(\lambda)$, has a spectral shape that is independent of the spectrometer, and the excitation LED exerts influence only through a constant factor on $f(\lambda)$ proportional to the excitation intensity; furthermore, the fluorescence profile is not modulated by any light in the emission band.

As shown in step 322, the software or code switch provided for in step 317 allows for the selection of a different illuminant for $I_{standard}$ that does not corresponds to a specific xenon lamp spectrum. Instead $I_{standard}$ can be selected so that it is the same as $I(\lambda)_{E313}$. Here, because the values for $I_{standard}$ and $I(\lambda)_{E313}$ match one another, the two values then cancel out. By using this calculation arrangement, $f(\lambda)$ will appear in the tristimulus integrals without modulation by any illuminant. As a result, the shape of the FSRF will be properly imprinted on the spectrum integral so as to produce a whiteness index that is invariant to the light source in the spectrophotometer. Furthermore, since only $kf(\lambda)$ is present, the integrals provide more consistent and stable sample dependent values for use in the WI value calculation.

Thus, using the approach provided herein, the TSFR, FSRF and WI values can each be determined without the use of instrument dependent measurements values. As such, TSRF, FSRF and WI can all be compared to measurements obtained using a different instrument.

Even though the described approaches allow for instrument independent measurements, the compensation value for k needs to be determined. If k is known at the time of calculation, then the process proceeds to step 312 and the TSRF, WI or FSRF value is calculated using the selected illuminant standard.

In the above discussion, excitation strength of the illuminant is captured as part of factor k of EQU. 4. As a result, the processor 104 is configurable by a whiteness value calculation module 220 to alter the k factor depending on the needs and conditions of the measurement configuration. In practice, the modifying the value of k is analogous to the UV-filter adjustment in a conventional spectrophotometer. However, in the described approach, the adjustment is entirely data driven and does not require any movement or adjustment of the measurement arrangement. As a result, more consistent measurements can be obtained.

Figure 5:
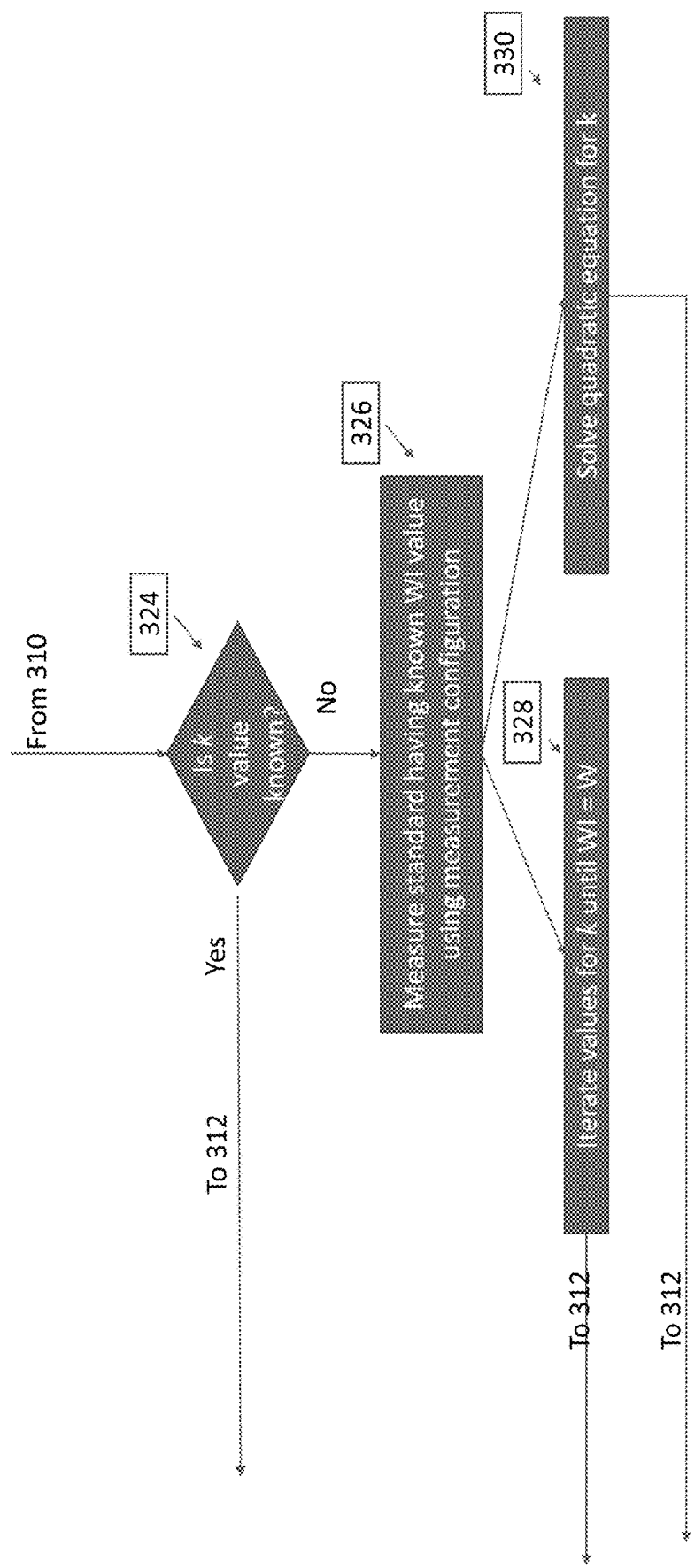
FIG. 5 flow diagram detailing particular steps in the device independent whiteness measurement process according to one or more implementations of the present application.

For example, and in no way limiting, the FSRF signal might be too much or too little depending on the light intensity of the UV LED. Therefore, a whiteness calibration is needed to make sure the proper whiteness value can be obtained. In one particular implementation, such a whiteness calibration can be accomplished by a processor 104 configuring with the whiteness value calculation module 220. As shown in the decision step 324 of FIG. 5, where the k value is known, the processor 104 accesses the known k value and proceeds to calculate the TSRF value in step 312.

Where the k value is unknown or has not been established yet, a whiteness sample with known whiteness value is measured by the light measurement device described herein as shown in step 326. In one or more implementations, the whiteness value calculation module 220 is hardware or software that configures the processor 104 to obtain the parameter k such that the value obtained according to the WI calculation matches the known whiteness index of the sample.

By way of further implementation, in order to calculate the calibration factor k, measurements using the described measurement configuration are obtained of a sample having a known whiteness index. For instances, as shown in step 326, a value for $f(\lambda)$ is obtained by measuring a white reference sample under UV light. Likewise, the value for $R(\lambda)$ is obtained by measuring the white reference sample under visible light. In one arrangement, the processor 104 is configured to compute a new value $\Phi_0$ according to the following:

$$\Phi_0 = \frac{f(\lambda)}{I_{standard}(\lambda)}$$

Where $I_{standard}(\lambda)$ is the same as the value selected for inclusion in EQU. 4. Here, $\Phi$ can be used to represent the FSRF value such that $\Phi = k\ \Phi_0$. However, at this step $\Phi$ cannot be determined because k is still unknown.

In order to determine k, the whiteness index (WI) for the sample is calculated according to WI(R+k $\Phi_0$) as provided in step 328. Here, the term R+k $\Phi 0$ represents the TSRF value. In one arrangement, k is determined by iterating over the possible values for k until the solution to the WI calculation equals the pre-determined whiteness index value for the calibration standard.

By way of non-limiting example, the value for k is determined by in order to calculate WI(R+k $\Phi_0$), the following notational abbreviations are used for ease of calculation:

$a \equiv (WI, x)$, $b \equiv (WI, y)$, $I \equiv I_{E313}$, $W \equiv WI$

In one particular arrangement, the processor 104 is configured by one or more submodules of the calibration module to determine W according to the following:

$W = Y + a(x_n - x) + b(y_n - y)$.

In a further arrangement, W can be expressed in terms of X, Y, Z where:

$$W(X+Y+Z)=Y(X+Y+Z)+(ax_n+by_n)(X+Y+Z)-(a+b)(X+Y).$$

The processor 104 is further configured by one or more submodules to determine the CIE integrals of the known whiteness sample measurement according to:

$$R_x = 100\frac{\int d\lambda R(\lambda)I(\lambda)_{E313}\bar{x}(\lambda)}{\int d\lambda I(\lambda)_{E313}\bar{y}(\lambda)}$$

$$R_y = 100\frac{\int d\lambda R(\lambda)I(\lambda)_{E313}\bar{y}(\lambda)}{\int d\lambda I(\lambda)_{E313}\bar{y}(\lambda)}$$

$$R_z = 100\frac{\int d\lambda R(\lambda)I(\lambda)_{E313}\bar{z}(\lambda)}{\int d\lambda J(\lambda)_{E313}\bar{y}(\lambda)}$$

$$\Phi_x = 100\frac{\int d\lambda \Phi 0(\lambda)I(\lambda)_{E313}\bar{x}(\lambda)}{\int d\lambda I(\lambda)_{E313}\bar{y}(\lambda)}$$

$$\Phi_y = 100\frac{\int d\lambda \Phi 0(\lambda)I(\lambda)_{E313}\bar{y}(\lambda)}{\int d\lambda I(\lambda)_{E313}\bar{y}(\lambda)}$$

$$\Phi_z = 100\frac{\int d\lambda \Phi 0(\lambda)I(\lambda)_{E313}\bar{z}(\lambda)}{\int d\lambda I(\lambda)_{E313}\bar{y}(\lambda)}$$

Here, $\bar{x}$, $\bar{y}$ and $\bar{z}$ each are color matching functions selected using the 1931 or 1964 standards, and $I(\lambda)_{E313}$ is an illuminant (i.e. D50, D65 or C.). The processor 104 is further configured by one or more submodules to describe the X, Y, Z inputs for use in the WI calculation using the calculated integrals. For instance, the input values for the WI calculation can be provided as follows:

$$X = R_x + k\Phi_x,$$

$$Y = R_y + k\Phi_y, \text{ and}$$

$$Z = R_z + k\Phi_z$$

In order to evaluate k, a processor 104 is configured by one or more submodules of the whiteness value calculation module 220, to calculate the values for Rx, Ry, Rz, Φx, Φy and Φz. For example, in one implementation, the value for k used to calculate the X, Y and Z values provided above are iterated over until the WI calculation produces an output value that matches the known WI value. That is, a value for k is selected. The selected k value is then used to calculate the WI for the sample. Based on the comparison of the calculated WI and the known WI value, the calculation is re-run with a different value of k. The processor 104 is configured to iterate this process until a value for k is identified such that its inclusion in the WI equation results in WI=W (e.g. the pre-determined whiteness index value). This process can be analogized to the movement of a UV filter to determine the proper calibration factor. Here, however, the adjustment is an algorithmic iteration of possible k values. As a result, the measurement configuration described herein can be implemented with no moving filter elements, thus leading to more reproducible measurements.

In an alternative arrangement as shown in step 330, the value for k is determined by setting the WI value for the sample to the known value W and solving the WI equation for k. In a particular configuration, the result of this approach is a quadratic equation represented by:

$$[(W-ax_n-by_n)(R_xR_y+R_z)+k(\Phi_x+\Phi_y+\Phi_z)]=(R_y+k\Phi_y)$$
$$[(R_xR_y+R_z)+k(\Phi_x+\Phi_y+\Phi_z)]-(a+b)((R_xR_y)+k(\Phi_x+\Phi_y))$$

$$\Rightarrow Ak^2 + Bk + C = 0$$

Where $A = \Phi_y(\Phi_x + \Phi_y + \Phi_z)$, $B = -(\Phi_x+\Phi_y+\Phi_z)(W-ax_n-by_n)+\Phi_y(R_xR_y+R_z)+R_y(\Phi_x+\Phi_y+\Phi_z)-(a+b)(\Phi_x+\Phi_y)$, and $C = -(R_xR_y+R_z)(W-ax_n-by_n)+R_y(R_xR_y+R_z)-(a+b)(R_xR_y)$ Thus, in this alternative configuration, the quadratic equation is solved for k, using whiteness value calculation module 220. Once the value of k has been determined, the value can be stored for further use. Once the k value has been obtained, the measurement configuration is now whiteness calibrated or UV calibrated, and equation (5) can be used to obtain the FSRF, TSRF and/or whiteness index of a given sample as in steps 312, 320 or 322.

In a different implementation, a traditional spectrophotometer can be used to measure UV excluded RSRF, and a UV light source such as a UV LED can be used to measure FSRF separately. After the two components RSRF and FSRF are obtained, a similar process as described in the previous implementation can be followed to standardize TSRF and calibrate whiteness.

Alternatively, a UV bandpass filter can be added on top of a traditional light source such as a Xenon lamp in the spectrophotometer to provide pure UV excitation light to measure FSRF, and a similar process can be followed to standardize TSRF and calibrate whiteness.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method for providing a device independent total spectral radiance factor of a sample, the method comprising:
    obtaining, using a light measurement instrument, a first measurement of the sample under at least one illuminant that excludes UV spectral radiance;
    obtaining, using a light measurement instrument, a second measurement of the sample under at least one illuminant that provides a UV excited spectral radiance;
    obtaining a compensation value for the UV excited spectral radiance measurement;
    accessing a standard illumination profile from a predefined list of standard illuminant profiles;
    calculating, as an updated second measurement value, the quotient of the product of the compensation value and the second measurement value divided by the accessed standard illumination profile;
    determining the total spectral radiance factor value for the sample by using the first and updated second measurement value; and
    outputting the total spectral radiance factor value.

2. The method of claim 1, wherein calculation the total spectral radiance factor value includes determining B($\lambda$) as the total spectral radiance factor according to:

$$B(\lambda) = R(\lambda) + \frac{kf(\lambda)}{I_{standard}(\lambda)}$$

where R($\lambda$) is the first measurement value and f($\lambda$) is the second measurement, k is the compensation value and $I_{standard}(\lambda)$ is the standard illumination profile.

3. The method of claim 2, wherein the compensation value is obtained by measuring a calibration standard having a known whiteness index using the light measurement instrument and:
    obtaining a first measurement of the calibration standard under at least one illuminant that excludes UV spectral radiance, (R);
    obtaining, using the light measurement instrument, a second measurement of the sample under at least one illuminant that provides a UV excited spectral radiance, f;

$$\text{determining } \Phi_0 = \frac{f(\lambda)}{Istandard(\lambda)},$$

calculating a whiteness index (WI) according to WI(R+k $\Phi_0$), by iterating values for k until WI matches the known whiteness index value for the calibration standard, or directly solving k so the WI matches the known whiteness index value for the calibration standard.

4. The method of claim 3, wherein the measurement device used to acquire the RSRF and FSRF values is the same measurement device used to acquire the first and second measurements.

5. The method of claim 1, wherein the standard illumination profile is selected from one of a group of CIE standard illuminants.

6. The method of claim 5, wherein the CIE illuminants include C, D50, D55, D65, and D75.

7. The method of claim 1, wherein the one of the at least one illuminant is configured to produce light that excludes UV spectral radiance and another of the at least one illuminant is configured to produce UV spectral radiance.

8. The method of claim 7, wherein both the at least one illuminant and the another of the at least one illuminant are light emitting diodes (LEDs).

9. The method of claim 1, wherein one of the at least one illuminant is configured to produce light that includes UV spectral radiance and is further configured with a selectable UV bandpass filter to provide only UV excitation light to obtain the second measurement.

10. The method of claim 1, wherein the compensation value and the illumination profile are accessed from one or more storage data storage devices.

11. The method of claim 1, wherein the measurement device used to obtain the first measurement is different from the measurement device used to obtain the second measurement.

12. A system for providing a device independent total spectral radiance factor of a sample, the system comprising:
at least two illumination sources, wherein a wavelength range of the first of the at least two illumination sources does not overlap with a wavelength range of a second illumination of the at least two illumination sources;
a light measurement device configured to output a value in response to light incident thereupon;
a processor configured to execute code stored on a memory thereof to:
receive a first measurement of a sample under the first of the at least two illumination sources;
receive a second measurement of the sample under the second of the at least two illumination sources;
obtain a compensation value;
access a standard illumination profile;
calculate a total spectral radiance factor value for the sample by obtaining the sum of the first measurement and the quotient of the product of the compensation value and the second measurement value divided by the accessed illumination profile; and
output the calculated total spectral radiance factor value.

13. The system of claim 11, wherein processor is configured to calculate the total spectral radiance factor value $B(\lambda)$ according to:

$$B(\lambda) = R(\lambda) + \frac{kf(\lambda)}{I_{standard}(\lambda)}$$

where $R(\lambda)$ is the first measurement value and $f(\lambda)$ is the second measurement, k is the compensation value and $I_{standard}(\lambda)$ is the standard illumination profile.

14. The method of claim 12, wherein the processor is further configured to obtain the compensation value by:
obtaining a first measurement of a calibration standard having a known whiteness index using the light measurement instrument under at least one illuminant that excludes UV spectral radiance, (R);
obtaining, using the light measurement instrument, a second measurement of the sample under at least one illuminant that provides a UV excited spectral radiance, f;

determining $\Phi_0 = \frac{f(\lambda)}{Istandard(\lambda)}$, calculating a whiteness index (WI) according to WI(R+k $\Phi_0$), where the value for k is adjusted until WI matches the known whiteness index value for the calibration standard, or k is directly solved so the WI matches the known whiteness index value for the calibration standard.

15. A method for providing a device independent total spectral radiance factor of a sample, the method comprising:
obtaining, using a light measurement instrument, a first measurement of the sample under at least one illuminant;
applying a LTV bandpass filter to the at least one illuminant;
obtaining, using a light measurement instrument, a second measurement of the sample using the illuminant configured with the UV bandpass filter;
obtaining a compensation value for the UV excited spectral radiance measurement using the first measurement;
accessing a standard illumination profile from a predefined list of standard illuminant profiles;
calculating a total spectral radiance factor value for the sample by obtaining the sum of the first measurement and the quotient of the product of the compensation value and the second measurement value divided by the accessed standard illumination profile; and
outputting the total spectral radiance factor value.

16. The method of claim 15, wherein processor is configured to calculate the total spectral radiance factor value $B(\lambda)$ according to:

$$B(\lambda) = R(\lambda) + \frac{kf(\lambda)}{I_{standard}(\lambda)}$$

where $R(\lambda)$ is the first measurement value and $f(\lambda)$ is the second measurement, k is the compensation value and $I_{standard}(\lambda)$ is the standard illumination profile.

17. The system of claim 16, wherein processor is configured to calculate the total spectral radiance factor where $I_{standard}(\lambda)$ is a specific xenon flash illumination profile.

18. The system of claim 15, wherein processor is further configured to calculate a whiteness index using the total spectral radiance factor $I_{standard}(\lambda)$ is a specific xenon flash where illumination profile.

19. The system of claim 15, wherein processor is further configured to calculate a whiteness index using the total spectral radiance factor where $I_{standard}(\lambda)$ is from an ASTM E313 protocol illumination profile.

* * * * *